March 12, 1957     E. F. FARRELL     2,784,675
HYDRODYNAMIC COUPLING
Filed Dec. 22, 1952
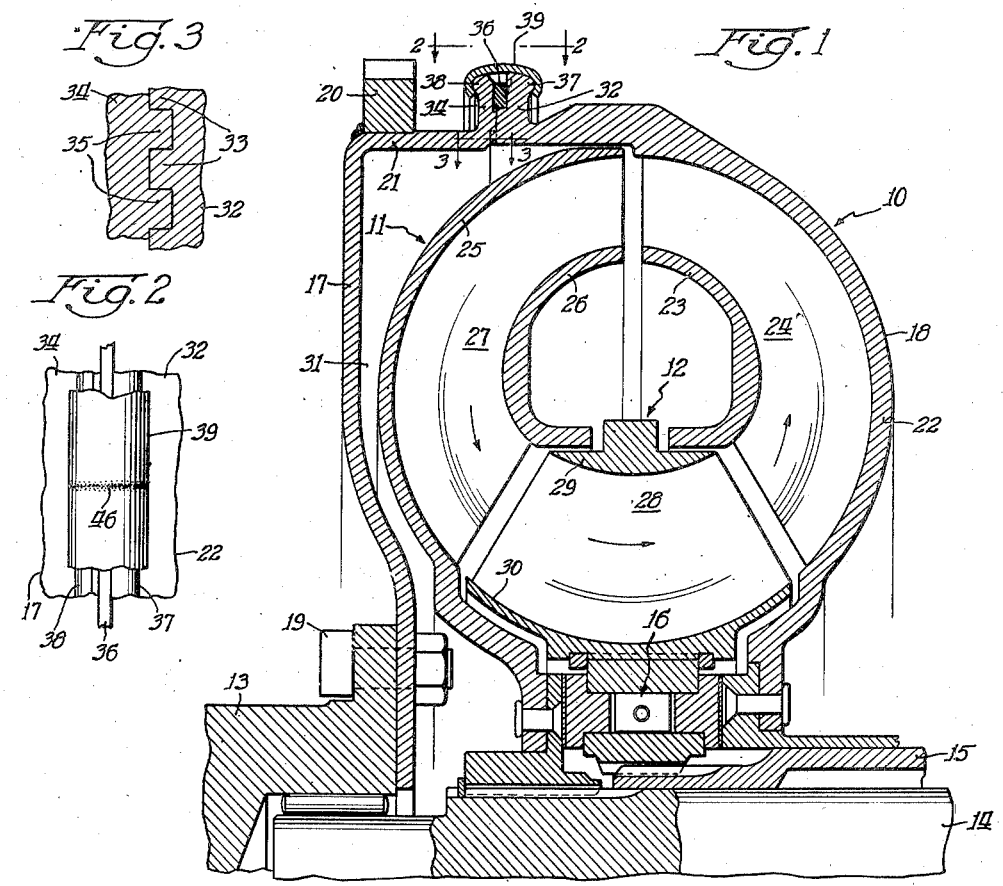
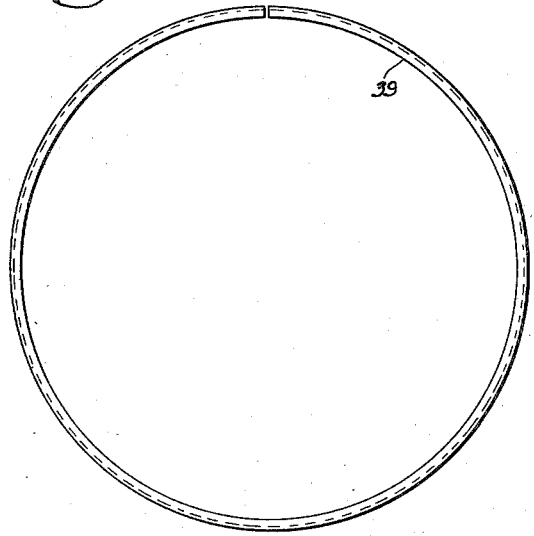
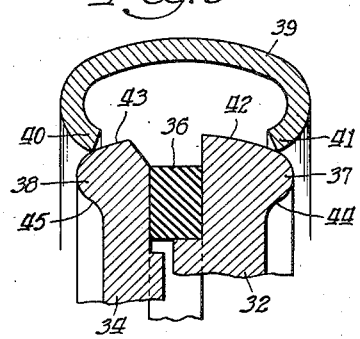
Inventor:
Eugene F. Farrell
By

United States Patent Office 2,784,675
Patented Mar. 12, 1957

2,784,675

HYDRODYNAMIC COUPLING

Eugene F. Farrell, Grosse Pointe, Mich., assignor to Borg-Warner Corporation, Chicago, Ill., a corporation of Illinois Application December 22, 1952, Serial No. 327,312

2 Claims. (Cl. 103—115)

This invention relates to hydrodynamic couplings and more particularly to such couplings comprising a vaned pump and a vaned turbine, the pump usually including a driving member of disk or dished-like shape and a vaned annular shell connected together to define a fluid chamber receiving the turbine, the driving member being connected to a source of power, such as an engine, for driving the pump.

In the manufacture of hydrodynamic couplings, the vanes and shell of the pump and turbine are conventionally formed of aluminum, or other light weight metal, by casting processes, such as die-casting, sand-casting, or plaster mold casting, for purposes of economy. The pump shell is usually connected to an annular disk or dished-shaped driving member to provide a fluid chamber, the member being formed of cast iron, or a stamping of sheet metal such as steel, having the inherent strength required to transfer torque from an engine to the vaned shell of the pump. A problem exists in the securing of the steel driving member to the aluminum shell in an economical and expeditious manner in the manufacture of fluid couplings as it is necessary to provide a mechanical connection between the steel driving member and aluminum shell, which is capable of preventing axial separation of the member and shell by the fluid, under high pressure in the fluid chamber defined by the shell and member, and consequent escape or leakage of fluid from the chamber, as well as being able to effectively withstand the considerable forces, engendered by the transmission of torque from the drive member to the shell, tending to sever the connection of the member and shell, during operation of the coupling. While it has been proposed to provide radially extending flanges on the outer peripheries of the driving member and shell and having openings for receiving bolts to secure the shell and member together. It has also been suggested that the flanges of the member and shell be threaded for engagement with each other, or an annular threaded element be engaged with the threaded member and shell, to secure the shell and member. Such mechanical connection of the shell and member are expensive and costly in the manufacture of fluid couplings in production quantities due to the labor cost involved in bolting the shell and member together and requiring the bolts to be uniformly tightened in order to insure that the gasket, usually positioned between the member and shell, will be effective to prevent leakage of fluid, under high pressure, from the fluid chamber provided by the assembly.

It will be noted that the described mechanical connection permits the ready and easy assembly and disassembly of the driving member and shell of the pump, the disassembly of the shell and pump being quickly accomplished by merely removing the end 39a of the locking element from the groove 41 in the shell, pulling the element to remove it from the grooves 35 and 38 in the shell and driving member, and then separating the shell and driving member by relatively moving the same in an axial direction to withdraw the lugs 37 of the driving member from the grooves 33 in the shell.

It is an object of the invention to provide an improved arrangement for connecting a driving member and a vaned shell of a hydrodynamic coupling element, such as a pump.

It is another object of the invention to provide a hydrodynamic coupling vaned element comprising a driving member of disk or dished-shaped form and a vaned shell having their outer peripheries formed to provide radially extending flanges and connecting the flanges together by a resilient clamping device, the engaged portions of the driving member and shell having interengaging portions or positive interengageable teeth effective to transmit torque from one to the other of these members.

Other objects and advantages of the invention will become apparent from the following description taken in connection with the drawing in which:

Fig. 1 is a cross-sectional view through the upper half of a fluid coupling illustrating a vaned pump element embodying my invention;

Figs. 2 and 3 are cross-sectional views of the lines 2—2 and 3—3 of Fig. 1 showing details of the mechanical connection, including a clamping ring, between the drive member and shell of the pump element;

Fig. 4 is an end elevation of the clamping ring shown in Fig. 1;

Fig. 5 is an enlarged cross-sectional view of portions of the shell drive member, and clamping ring prior to assembly of the same.

Referring to Fig. 1, the hydrodynamic coupling there shown is of the torque converter type and comprises three vaned elements, namely a pump 10, a turbine 11, and a stator 12. The pump 10 is secured to a drive shaft 13 coupled to a source of power, such as an engine, and the turbine 11 is connected to a driven shaft 14 for operating any desired mechanism. The stator 12 has an overrunning connection to a stationary reaction sleeve 15 through the medium of a one-way sprag type clutch 16, such as shown and described in U. S. Patent 2,366,842 issued January 9, 1945.

The pump 10 may be formed of two annular and generally dished shaped members 17 and 18 in axial alignment. The member 17, in the form of a disk having an axially extending outer peripheral portion 21, is secured to the driving shaft 13 by bolts 19 and may be provided with an annular toothed band 20 surrounding and secured to the radially outer peripheral portion 21 to provide a flywheel for cooperation with the gears of an electric starter motor in the event the device is used with an internal combustion engine. The member 18 may comprise a shell 22 of semi-toroidal shape and a core ring 23 of generally similar shape, and vanes 24 extending between and connected to the shell and core ring. The turbine 11 also comprises a semi-toroidal shell 25 and core ring 26 having vanes 27 extending between and secured to the shell and core ring. The stator 12 comprises vanes 28 extending between a core ring 29 and shell 30. It will be understood that the shell and core ring of each vaned element described are both annular and complete rings, although only portions of the shells and core rings are illustrated in the drawing and the vanes may be curved and of varying thickness, such as those shown in U. S. Patents 2,306,758 and 2,333,680. The three vaned elements form and function as a hydrodynamic torque converter with the vanes of the pump functioning to impart energy to a body of fluid or liquid in the chamber 31, formed by the driving member 17 and shell 22 of the pump, the turbine receiving energy from the fluid and the stator being held from rotation and functioning as a reaction element by the one-way clutch to change the direction of the flow of fluid so that the device functions to multiply torque until such time that the change in the direction of fluid leaving the turbine and entering the stator in the fluid circuit, indicated by the arrows, causes the stator 30 to be released by the one-way clutch 16 to provide a substantially direct drive connection between the drive shaft 13 and the shaft 14.

The shell, vanes, and core ring of each vaned element described are of aluminum and may be formed as an integral unit by die-casting, sand-casting, or plaster mold casting, methods conventionally employed to provide for the facile and economical manufacture of these vaned elements. The disk 17 of the pump is preferably formed of sheet steel for obtaining the advantages of lightness in weight and the required strength for the transmission of torque, the disk 17 being made to assume the shape shown in Fig. 1 by a simple stamping operation.

It has been customary in the art to connect a steel driving member, such as 17, to an aluminum shell, such as 22, by mechanical connections, in view of the inability to weld steel to aluminum. Such mechanical connections have heretofore necessitated the provision of holes in radially extending flanges on the outer peripheries of the driving disk and the shell for receiving bolts to connect the disk and shell together; or, by forming threads on the outer peripheral edges of the driving disk and shell and threadedly engaging these members, or employing an annular threaded member to engage threads on the disk and shell, to securely hold the disk and shell together for torque transmission. Both of these ways of mechanically connecting the driving disk and a shell are inefficient and expensive operations in mass production manufacture, in view of the labor costs involved and the employment of expensive automatic drilling or thread-forming machines. Also, one-way clutches for the stator become worn in use and require replacing which necessitates the disassembly of the torque converter, including the driving disk and the shell, and the reassembly of these parts of the hydraulic torque converter, which feature is disadvantageous because of the considerable time required for these operations in making repairs and consequent disabling of the mechanism, such as an automobile, with which the converter is used.

The present invention is directed to the provision of a simple and inexpensive mechanical connection for uniting the driving member and vaned shell of a hydrodynamic coupling vaned element, such as a pump, and defining a closed fluid chamber containing the working parts of the hydrodynamic coupling. The proposed mechanical connection considerably expedites the time required to assemble and disassemble a hydrodynamic coupling with attendant low costs of labor and without the necessity of employing expensive machines increasing the cost of manufacture of a hydrodynamic vaned element such as a pump.

As previously described, the pump 10 comprises the shell 22, vanes 24 and core ring 23 which are formed by any suitable method to provide an integral unit, being preferably cast as by die-casting, sand-casting, or by the use of plaster molds. Assuming that the pump shell, vanes and core ring are cast by the use of a plaster mold, the mold is formed with the requisite and desired shapes to form these parts of the pump as shown in Fig. 1. Molten aluminum is then poured into the mold and allowed to cool to solidify the same and thereby produce the cast aluminum structure comprising the pump shell, core ring and vanes with the shell 22 having a radially extending flange 32, at its radially outer peripheral edge as shown in Figs. 1, 4 and 5 and having a plurality of teeth or splines 33 extending circumferentially of the annular end of the shell 22.

Referring to the disk 17, the radially outer peripheral edge thereof is also provided with an upstanding radially outwardly extending flange 34 shaped similarly to the flange 32 on the shell 22, the flange 34 having a plurality of splines 35 extending circumferentially in spaced relation about the annular edge of the disk 17 and intermeshing with the splines 33 of the shell 22 as shown in Figs. 1, 4 and 5. A gasket 36 of any suitable material, such as rubber, is positioned between the flanges 34 and 32 and is compressed thereby to prevent leakage of fluid, under high pressure, from the fluid chamber 31. The flanges 32 and 34 as shown in Figs. 1 and 5 are each of bulbous shape to provide the respective lips 37 and 38 on the radially outermost extremities of these flanges. A clamping ring 39 of U-section as shown in Fig. 1 is positioned upon the radially outermost extremities of the flanges 32 and 34 with each of the opposite edges thereof being of hooked-shaped formation and surrounding and engaging the respective lips 37 and 38 on the flanges 32 and 34. The ring 39 is formed of any suitable metal, such as spring steel, having resiliency to forcibly urge the flanges 32 and 34 towards each other to thus effectively clamp the disk 17 and shell 18 together to prevent axial separation of the same by the working fluid under high pressure in the torque converter, and to maintain the teeth 33 on the flange 32 and the teeth 35 on the flange 34 in intermeshing engagement, as shown in Fig. 3, during the transmission of torque. The clamping ring 39 is also effective to compress the annular gasket 36 between the flanges 32 and 34 so that the gasket is effective to prevent leakage of the fluid in the fluid chamber 31 exteriorily of the torque converter during operation of the torque converter when high fluid pressures prevail in the chamber 31.

It will thus be apparent that the ring 39 is instrumental to maintain the splines of the confronting ends of the disk 17 and shell 22 in engagement to effect the transmission of torque from the driving disk 17 to the shell 22, to prevent axial separation of the disk 17 and shell 22, and to compress the gasket 36 to prevent leakage of liquid from the chamber 31, during operation of the torque converter.

In the assembly of the disk 17 and shell 22, the disk and shell are positioned in relation to each other so that the flanges 37 and 38 are in confronting relationship with the gasket 36 disposed therebetween and radially outwardly of the teeth or splines 33 and 35 thereon. The clamping ring 39 is initially formed of a flat metallic strip which may be stamped to provide the U-section shape thereof as shown in Figs. 1 and 5, the strip thereafter being bent to form the annular member shown in Fig. 4 with ends of the strip adjacent to each other. The clamping ring 39 is then positioned to surround the flanges 32 and 34 and is urged toward the flanges so that the ring 39 will expand by its engagement with the inclined surfaces 42 and 43 on the lips 37 and 38, respectively, until such time as the edges of the clamping ring 39 ride over the portions of highest elevation on the lips whereupon the hook-shaped portions 40 and 41 will be effective to engage the radially inner inclined surfaces 44 and 45 of the lips 37 and 38, respectively, with the inner surface of the clamping ring, between the hooked shaped portions 40 and 41, in engagement with the surfaces 42 and 43 of the flanges as shown in Fig. 1. Due to the resiliency of the clamping ring 39, the flanges 32 and 34 will be drawn toward each other to mesh the splines 33 and 35 thereon as shown in Fig. 3 and to compress the rubber gasket 36 disposed between the flanges.

The adjacent ends of the clamping ring 39 may then be welded to each other by a weld 46, as shown in Fig. 2, to effect completion of the assembly.

It will be apparent that the clamping ring 39 is thus effective to provide a ready and easy assembly of the disk 17 and the shell 22 during the manufacture of hydrodynamic couplings and in the event the one-way clutch, or bearing or other parts of the torque converter, should become worn in use, the worn parts may be readily replaced as it will only be necessary to remove the clamping ring 39 to disassemble the disk 17 and shell 22 thus providing an expeditious and simple operation to either effect assembly or disassembly of the driving disk 17 and the shell 22 of the pump. It will be noted that the spring steel, or other resilient metal, forming the clamping ring 39 possesses such inherent clamping strength as to effectively prevent any possibility of separation of the driving disk and shell by the pressure of the fluid within the chamber defined by the same during operation of the hydrodynamic coupling.

It will be apparent to those skilled in the art that other modifications in the particular structure herein described may be used, without departing from the principles of the invention and it is intended that such modifications shall fall within the scope of the appended claims.

I claim:

1. In a hydrodynamic coupling element, an annular dished member having its radially outer periphery formed by an axially extending portion terminating in a radially extending flange; a vaned annular shell having a radially extending flange adjacent the flange on said member, each of said flanges being provided with a lip at one side thereof having an arcuate surface said lips being disposed on the sides of said flanges remote from each other; a plurality of circumferentially spaced splines on said flanges and in intermeshing relation; a sealing member disposed between said flanges and radially outward of said splines; and a resilient clamping ring of U-section surrounding said flanges and engaging the arcuate surfaces on said lips thereof to forcibly urge said flanges toward each other to maintain said splines in intermeshing relation and to compress said sealing member.

2. In a hydrodynamic coupling element, an annular dished member having its radially outer periphery formed by an axially extending portion terminating in a radially extending flange; a vaned annular shell member having a radially extending flange adjacent the flange on said member, one of said members being formed of aluminum and the other of said members being formed of ferrous metal, each of said flanges being provided with a lip at one side thereof having an arcuate surface, said lips being disposed on the sides of said flanges remote from each other; a plurality of circumferentially spaced splines on said flanges and in intermeshing relation; a sealing member disposed between said flanges and radially outward of said splines; and a resilient spring steel clamping ring of U-section surrounding said flanges and engaging the arcuate surfaces on said lips thereof to forcibly urge said flanges toward each other to maintain said splines in intermeshing relation and to compress said sealing member.

References Cited in the file of this patent

UNITED STATES PATENTS

| | | |
|---|---|---|
| 1,963,675 | Plainevaux et al. | June 19, 1934 |
| 2,140,106 | Cox et al. | Dec. 13, 1938 |
| 2,351,517 | Jandasek | June 13, 1944 |
| 2,412,024 | Young | Dec. 3, 1946 |
| 2,417,195 | Hargreaves | Mar. 11, 1947 |
| 2,494,539 | Bolender | Jan. 17, 1950 |
| 2,658,692 | Wolf | Nov. 10, 1953 |
| 2,672,279 | Willgoos | Mar. 16, 1954 |
| 2,689,682 | Boyd et al. | Sept. 21, 1954 |
| 2,695,131 | Price | Nov. 23, 1954 |